(12) United States Patent
Leu et al.

(10) Patent No.: US 6,695,444 B2
(45) Date of Patent: Feb. 24, 2004

(54) MULTICOLOR DYE SET WITH HIGH LIGHT-FASTNESS AND HIGH WATER-FASTNESS

(75) Inventors: Yi-Jing Leu, Hsinchu (TW); In-Shan Sir, Kaohsiung (TW); Yu-Chang Shen, Taipei (TW); Chia-Hsin Chien, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/178,837

(22) Filed: Jun. 25, 2002

(65) Prior Publication Data

US 2003/0025775 A1 Feb. 6, 2003

(30) Foreign Application Priority Data

Jul. 20, 2001 (TW) ........................................ 90117854 A

(51) Int. Cl.$^7$ .................................................. B41J 2/01
(52) U.S. Cl. .......................... 347/100; 347/95; 347/96; 106/31.13
(58) Field of Search ............................ 347/100, 96, 95; 106/31.13, 31.27, 31.49, 31.43, 31.58, 31.6; 8/638

(56) References Cited

U.S. PATENT DOCUMENTS

| | | | | |
|---|---|---|---|---|
| 5,108,504 A | * | 4/1992 | Johnson et al. | 347/100 |
| 5,507,865 A | * | 4/1996 | Yoshida et al. | 347/100 |
| 5,534,051 A | * | 7/1996 | Lauw | 347/100 |
| 5,580,372 A | * | 12/1996 | Gino et al. | 347/100 |

* cited by examiner

Primary Examiner—Stephen D. Meier
Assistant Examiner—Manish Shah
(74) Attorney, Agent, or Firm—Rabin & Berdo, P.C.

(57) ABSTRACT

An inkjet ink of multicolor dye set with high light-fastness and high water-fastness includes: a multicolor dye set, a surfactant, and an aqueous solvent. The multicolor dye set includes a cyan dye set, a magenta dye set, and a yellow dye set. The cyan dye set includes direct blue 199 dye, acid blue 9 dye, and direct blue 86 dye. The magenta dye set includes reactive red 180 dye, acid red 52 dye, and reactive red dye. The yellow dye set includes acid yellow 23 and direct yellow 86 dye. When the multicolor dye set of the invention is applied in ink-jet printing process, the high-quality printed image possesses great light-fastness and water-fastness high chroma, broad color gamut.

19 Claims, 4 Drawing Sheets

MULTICOLOR DYE SET WITH HIGH LIGHT-FASTNESS AND HIGH WATER-FASTNESS

This application incorporates by reference of Taiwan application Serial No. 090117854, filed Jul. 20, 2001.

BACKGROUND OF THE INVENTION

1. Field of the Invention

The invention relates in general to a multicolor dye set with high light-fastness and water-fastness, and more particularly to a multicolor dye set with high light-fastness and water-fastness suitable for use in ink-jet printing process.

2. Description of the Related Art

Generally, the multicolor inklet dye set consists of magenta ink, cyan ink, yellow ink, and black ink. Most of the multicolor inkjet dye sets are water-based dye sets in the commercial market. Recently, two more colors, light magenta ink and light cyan ink, have been adopted for adding variety to the inkjet ink. Even light yellow ink is added in the inkjet ink later. The composition of four-color, six-color, or sever-color inkjet ink consists of at least one dye or colorant, water, organic solvent, and other additives. However, the printing image formed by the water-base inkjet dye set has poor water-fastness and light-fastness quality. Hence, the colorant inkjet ink with better water-fastness and light-fastness quality has been aggressively developed in the recent years. Although the colorant inkjet ink has better water-fastness and light-fastness qualities, a need remains for adding the appropriate dispersant and binder. Also, the colorant particle with larger particle size than dye is much easier to precipitate and aggregate around the orifice. The printing image quality is consequently decreased due to the clogging of orifice. Accordingly, it is very important for the researchers to improve the water-fastness and light-fastness of the water-base inkjet dye set.

If the inkjet ink only consists of a single dye, it is easy to cause the plugging of the orifice due to the crystallization of the inkjet dye, so that many kinds of humectants are added in the inkjet ink. But, humectant present in the ink also postpones the time required for drying the printing image, and decreases the water-fastness quality of inklet ink. Addition of humectants are well known and are described in, for example, U.S. Pat. No. 4,631,085 (Kawanishi, et al., 1986), U.S. Pat. No. 4,713,113 (Shimada, et al., 1987), and U.S. Pat. No. 4,737,190 (Shimada, et al., 1988). Also, U.S. Pat. No. 5,925,177 (Carreira, et al., 1999) disclosed an ink composition comprising Acid Yellow 23 dye, urea, and water. Urea presented in the ink avoids the crystallization of Acid Yellow 23 dye, so as to solve the problem of plugging of the orifice.

There are a couple of requirements for a preferred ink and the printing image with better printing quality, such as good crusting resistance, good stability, proper viscosity, proper surface tension, high color saturation, little color-to-color bleed, rapid dry time, etc. During printing, the clogging of the orifice is not going to occur. Additionally, the image printed on the plain paper maintained in a high quality (i.e., high clearness and sharpness, etc.) as printed on the coating paper Color is represented by two appearance systems. One color appearance system, precisely specifies colors and shows the relationships among the colors, such as Ostwald system, Munsell system, and DIN system. For example, Munsell system, established by an American painter named Munsell, defines colors by the three properties of hue, value, and chroma. Munsell established numerical scales with visually uniform steps for each of these attributes. The other appearance system is a color-mixing system, which defines the color according to a mixing of three primary colors. So far, the Commission Internationale de L'Eclairage (CIE) system is the most important color mixing system, and is used in the present invention. In the CIE system, the color gamut is defined by $L^*$, $a^*$, and $b^*$, which represent the lightness, hue, and chroma (or saturation) of a color, respectively. The hue of a color represented by $a^*$ ranges from green of $-a$ to red of $+a$, and the chroma (or saturation) of a color symbolized by $b^*$ ranges from blue of $-b$ to yellow of $+b$.

Simply stated, whether the color gamut of ink is board can be determined by the CIE chromaticity diagram. Refer to FIG. 1, which shows color gamut comparisons of two different dye sets. The coordinate X represents hue and is denoted as $a^*$, while the coordinate Y represents chroma(or saturation) and is denoted as $b^*$. FIG. 1 indicated that color gamut of the first inkjet dye set 101 is broader than that of the second inkjet dye set 102. Consequently, the colors of the first inkjet dye set 101 are more abundant than that of the second inkjet dye set 102. Additionally, the light-fastness of ink can also be determined by the CIE chromaticity diagram. First, measure the optical property of the fresh printed image is measured, and a first chromaticity diagram is obtained. Second a radiation step is performed on the fresh printed image for a certain period of time. The optical property of the fresh printed image is then measured again, and a second chromaticity diagram is obtained. Finally, the first chromaticity diagram is compared to the second chromaticity diagram. Usually, the space covered by the second chromaticity diagram is smaller than the first chromaticity diagram. The space difference represents the light-fastness of the ink. The larger space difference represents the poorer the light-fastness of the ink. Similarly, the water-fastness of ink can also be determined by the CIE chromaticity diagram.

Accordingly, it is an important goal for the manufacturers and researchers to develop ink compositions exhibiting desirable characteristics of broad color gamut, high quality image, high light-fastness, and even high water-fastness.

SUMMARY OF THE INVENTION

It is therefore an object of the invention to provide a water-based multicolor dye set with high light-fastness and high water-fastness.

It is another object of the invention to provide improved ink compositions of multicolor dye set suitable for use in ink-jet printing process. The printed image formed by the ink of the invention has an excellent optical property of high light-fastness and high water-fastness. Also, the ink dye set of the invention exhibits a broad color gamut and great printing quality.

Those objects of the invention can be achieved by providing an ink-jet ink of water-based multicolor dye set with high light-fastness and high water-fastness, at least comprising a multicolor dye set, a surfactant, and an aqueous solvent. The multicolor dye set includes a cyan dye set, a magenta dye set, and a yellow dye set. The cyan dye set comprises direct blue 199 dye, acid blue 9 dye, and direct blue 86 dye. The magenta dye set comprises reactive red 180 dye, acid red 52 dye, and reactive red dye. The yellow dye set comprises acid yellow 23 and direct yellow 86 dye.

The surfactant of the invention is 2-pyrrolidone and EHMPD (2-ethyl-2-methylol-1,3-propylene glycol), which both are present in the ink in an amount of about 4.0 wt %, respectively. The ink-jet ink of the invention further comprises organic solvent such as 1,4-butandiol for enhancing the penetration and dispersion of the ink.

The ink-jet ink of the invention further comprises a pH buffer such as potassium hydroxide, a chelating agent such as urea, a humectant such as PEG (polyethylene glycol), a biocide, a preservative and other additives.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
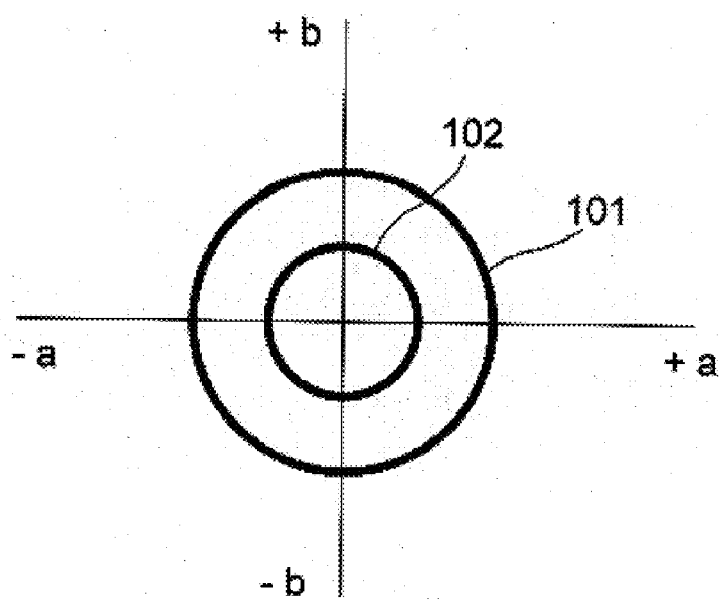
FIG. 1 shows color gamut comparisons of two different dye sets.

The inkjet ink of multicolor dye set with high light-fastness and high water-fastness of the invention at least includes a dye set, and a surfactant, dissolved in a solvent that includes water and at least an organic solvent. Preferably, the inkjet ink of the invention further comprises a pH buffer, a chelating agent, a biocide, a humectant, a preservative and other additives (such as an UV absorbent).

The multicolor dye set of the invention, including three color dye sets, comprises: (1) cyan dye set—direct blue 199 dye (available from Clariant), acid blue 9 dye (available from Clariant), direct blue 86 dye (available from Bayer), (2) magenta dye set—reactive red 180 dye (available from Bayer), acid red 52 dye (available from Clariant), reactive red (available from Bayer); and (3) yellow dye set—acid yellow 23 dye (available from Clariant), direct yellow 86 dye (available from Bayer).

The surfactant of the invention can be one or the combination of 2-pyrrolidone (available from DOW), and EHMPD (2-ethyl-2-methylol-1,3-propylene glycol) (available from Lancaster). The surfactant is present in an amount of from about 0.01 wt % to 10.0 wt % of the ink, and (each component) preferably about 4.0 wt %. One or more than one surfactants are added to adjust the viscosity for smoothing the ink supply and ejection, and also to adjust the surface tension of the ink to prevent feathering. Moreover, addition of surfactant(s) also enhances the dispersion of colorant in the ink, and ink penetration to the paper or other recording medium.

All agents of the ink dye set of the invention are dissolved in the solvent like water. The amount of water is about 50.0 wt %~85.0 wt % (by weight of the ink). The solvent further comprises an organic solvent for enhancing the penetration and dispersion of the ink. The organic solvent can be any one or any combination of the following: 13-S-5 (available from Sino-Japan Chemical), 13-S-7 (available from Sino-Japan Chemical), OT-75 (available from KYOWA), 465 (available from Air Product), and 1,4-butandiol (available from Lancaster). The organic solvent is present in an amount of from about 0.5 wt % to 3.0 wt % of the ink.

Colorants can only manifest the ideal color in an appropriate range of pH value. Therefore, the ink dye set of the invention preferably further comprises a pH buffer, such as potassium hydroxide (KOH). Potassium hydroxide is present in an amount of about 0.5 wt % of the ink.

The ink dye set of the invention can further comprise a chelating agent such as urea, which prevents the crystallization of the salt and the consequential nozzle clogging. Urea is present in an amount of about 0.5 wt % of the ink.

To prevent the clogging of the nozzle, humectants can be further added in the ink due to the ability of slowing down the evaporation rate of ink. Preferably, PEG700 (polyethylene glycol 700, available from U.C.C.) is chosen as the humectant added in the dye set of the invention. PEG700 is present in an amount of about 4.0 wt % of the ink.

Additionally, a biocide and a preservative can be further added in the ink to inhibit the growing of the bacteria and prevent the ink from deteriorating. Preferably, SL-700 (available from KYOWA) is chosen as the biocide added in the dye set of the invention. Moreover, it is well known to persons skilled in the art that other additives, such as enhancing light-fastness or the stability in storage, can be further added in the dye set of the invention.

The following examples are conducted to study the physical property of light-fastness of the ink. All parts and percentages are by weight.

The ink dye set used as a control is provided by Hewlett-Packard color cartridge C6578. The compositions of the ink dye set of the invention was prepared by simple mixing of the following ingredients:

| | Ingredient | Supplier | Amount |
| --- | --- | --- | --- |
| (1) Cyan | Direct blue 199 dye | Clariant | 3 wt % |
| | Acid blue 9 dye | Clariant | 1 wt % |
| | Direct blue 86 dye | Bayer | 0.5 wt % |
| | Humectant: PEG 700 (polyethylene glycol 700) | U.C.C. | 4.0 wt % |
| | Surfactant: 2-pyrrolidone | DOW | 4.0 wt % |
| | EHMPD | | 4.0 wt % |
| | Chelating agent: urea | Lancaster | 0.5 wt % |
| | pH buffer: potassium hydroxide | Lancaster | 0.5 wt % |
| | Biocide: SL-700 | KYOWA | 0.5 wt % |
| | Organic solvent: | | |
| | 13-S-5 | Sino-Japan Chemical | 2 wt % |
| | 13-S-7 | Sino-Japan Chemical | 2 wt % |
| | OT-75 | KYOWA | 3 wt % |
| | 465 | air product | 0.5 wt % |
| | Water | | |
| (2) Magenta | Reactive red 180 dye | Bayer | 4.0 wt % |
| | Acid red 52 dye | Clariant | 0.5 wt % |
| | Reactive red dye | Bayer | 0.5 wt % |
| | Humectant: PEG 700 (polyethylene glycol 700) | U.C.C. | 4.0 wt % |
| | Surfactant: 2-pyrrolidone, | DOW | 4.0 wt % |

-continued

|   | Ingredient | Supplier | Amount |
|---|---|---|---|
|   | EHMPD |   | 4.0 wt % |
|   | Chelating agent: urea | Lancaster | 0.5 wt % |
|   | pH buffer: potassium hydroxide | Lancaster | 0.5 wt % |
|   | Biocide: SL-700 | KYOWA | 0.5 wt % |
|   | Organic solvent: |   |   |
|   | 13-S-5 | Sino-Japan Chemical | 2 wt % |
|   | 13-S-7 | Sino-Japan Chemical | 2 wt % |
|   | OT-75 | KYOWA | 3 wt % |
|   | 465 | air product | 0.5 wt % |
|   | Water |   |   |
| (3) Yellow | Acid yellow 23 dye | Clariant | 5 wt % |
|   | Direct yellow 86 dye | Bayer | 1 wt % |
|   | Humectant: PEG 700 (polyethylene glycol 700) | U.C.C. | 4.0 wt % |
|   | Surfactant: 2-pyrrolidone, | DOW | 4.0 wt % |
|   | EHMPD |   | 4.0 wt % |
|   | Chelating agent: urea | Lancaster | 0.5 wt % |
|   | pH buffer: potassium hydroxide | Lancaster | 0.5% |
|   | Biocide: SL-700 | KYOWA | 0.5 wt % |
|   | Organic solvent |   |   |
|   | 13-S-5 | Sino-Japan Chemical | 2 wt % |
|   | 13-S-7 | Sino-Japan Chemical | 2 wt % |
|   | OT-75 | KYOWA | 3 wt % |
|   | 465 | air product | 0.5 wt % |
|   | Water |   |   |

Two ink dye sets (control and experimental) are respectively ejected on the plain paper and coating paper by a commercial inkjet printer. The printed images on the plain paper and coating paper are measured by a simple emitting machine of Microsol, respectively. Also, the water-fastness test is conducted by immersing the papers with resulting images in the deionized water.

Light-Fastness Test of Control Dye Set (Comparative)

The ink of control dye set (HP-C6578) is ejected by an inkjet printer, thereby forming a printed image on the commercial coating paper. The optical property of the printed image is measured to obtain the chromaticity curve, and the result is presented as the real line in FIG. 2. Then, the printed image is irradiated for 16 hours by the emitting machine of Microsol, wherein the irradiation quantity is equivalent to exposing to sunlight for 10 hours per day in three and half months. After irradiation, the optical property of the printed image is measured to obtain the chromaticity curve, and the result is presented as the dash line in FIG. 2.

Figure 2:
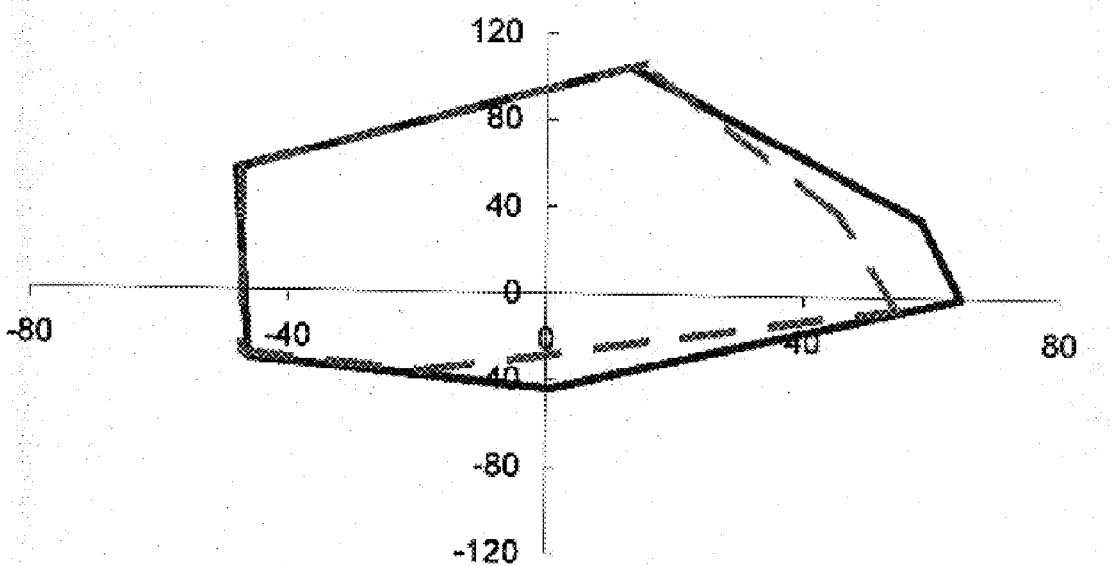
FIG. 2 is a chromaticity diagram of the printed image formed by comparative HP-C6578.

By comparing the chromaticity curves of FIG. 2, it indicates that the HP-C6578 color gamut of the after-irradiation curve is narrower than the before-irradiation curve. Therefore, the comparative HP-C6578 exhibited a weak property of light-fastness, particularly weak at the hue relevant to red color (right portion at the X-axis).

Light-Fastness Test of Experimental Dye Set (of the Invention)

The ink dye set of the invention is ejected by an inkjet printer, thereby forming a printed image on the commercial coating paper. The optical property of the printed image is measured to obtain the chromaticity curve, and the result is presented as the real line in FIG. 3. Then, the printed image is irradiated for 16 hours by the emitting machine of Microsol, wherein the irradiation quantity is equivalent to exposing to sunlight for 10 hours per day in three and half months. After irradiation, the optical property of the printed image is measured to obtain the chromaticity curve, and the result is presented as the dash line in FIG. 3.

Figure 3:
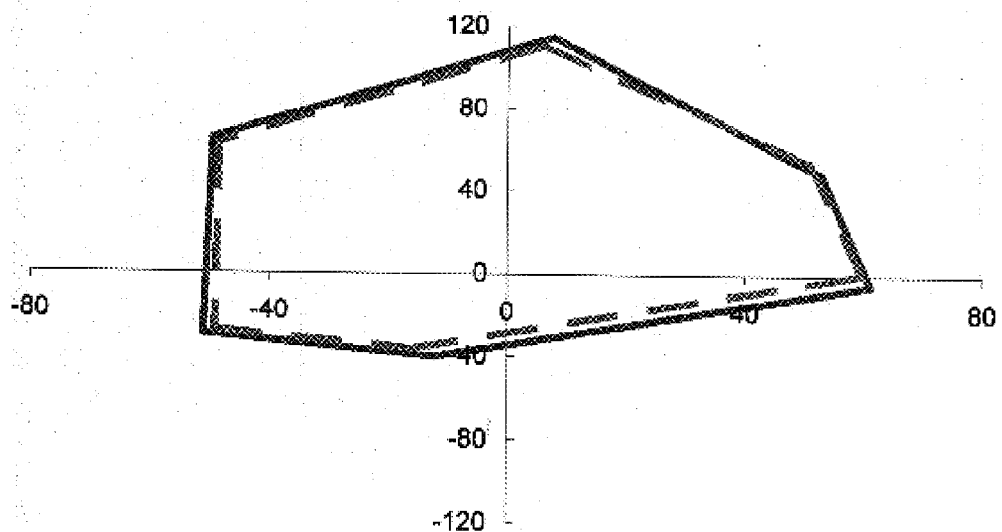
FIG. 3 is a chromaticity diagram of the printed image formed by ink dye set of the invention.

FIG. 3 indicates that the color gamut of the after-irradiation curve and the before-irradiation curve are almost identical. Therefore, the ink dye set of the invention exhibited good light-fastness.

Comparison of Light-Fastness Between Control and Experimental Dye Sets

The ink dye set of the invention and the comparative HP-C6578 are ejected by the inkjet printer to form the printed images on the commercial coating papers, respectively. The optical properties of the printed images are measured to obtain the chromaticity curves, and the results are presented in FIG. 4. The real line represents the chromaticity curve of the invention, and the dash line represents the chromaticity curve of HP-C6578. Then, the printed images are irradiated for 16 hours by the emitting machine of Microsol, wherein the irradiation quantity is equivalent to exposing to sunlight for 10 hours per day in three and half months. After irradiation, the optical properties of the printed images are measured to obtain the chromaticity curves, and the results are presented in FIG. 5. Also, the real line represents the chromaticity curve of the invention, and the dash line represents the chromaticity curve of HP-C6578.

Figure 4:
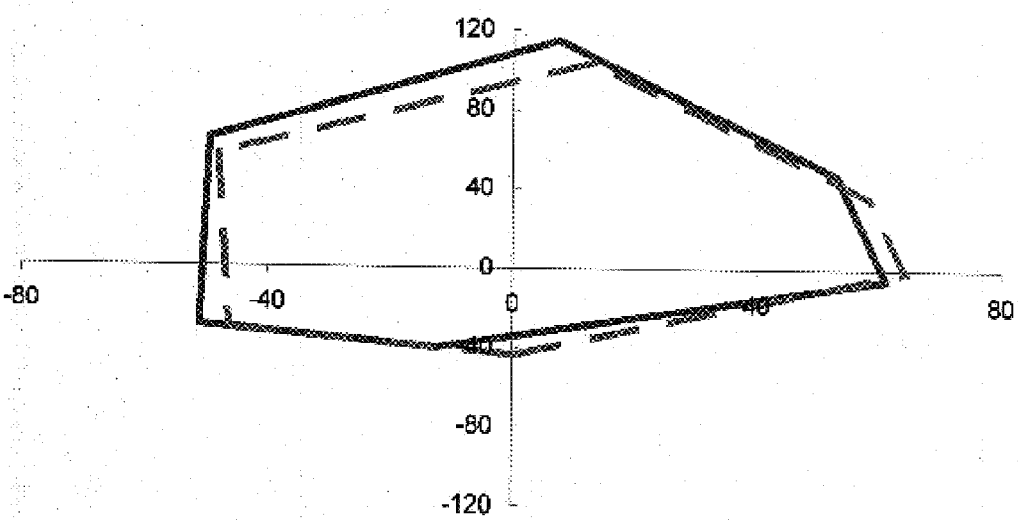
FIG. 4 is a chromaticity diagram of comparative HP-C6578 and ink dye set of the invention before irradiation.
Figure 5:
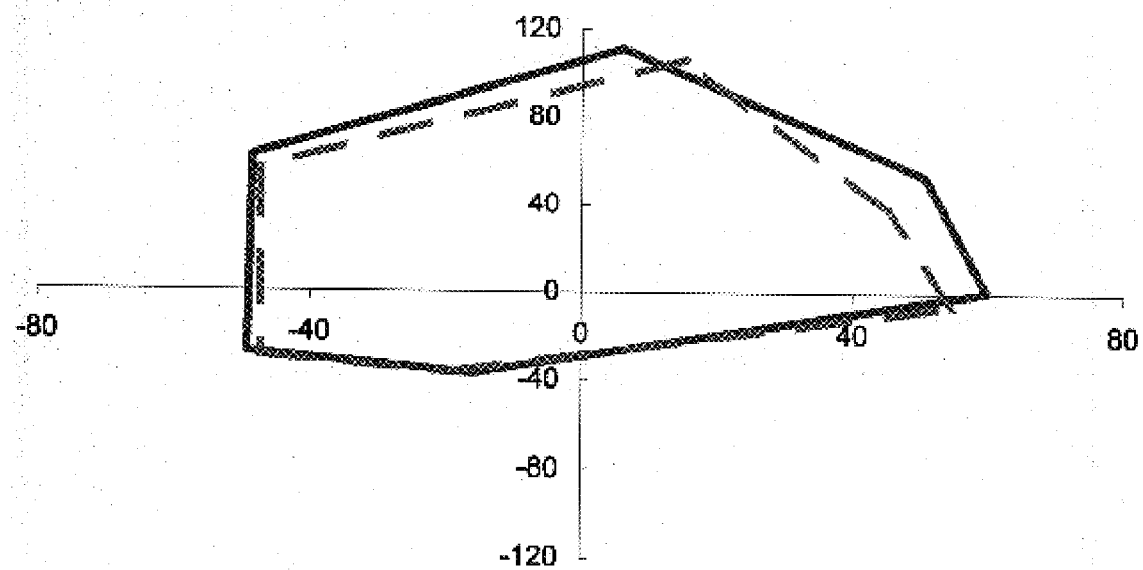
FIG. 5 is a chromaticity diagram of comparative HP-C6578 and ink dye set of the invention after irradiation.

Both results of FIG. 4 and FIG. 5 apparently show that the color gamut of the invention is larger than that of HP-C6578. Therefore, the ink dye set of the invention exhibiting a broader color gamut is able to produce a printed image more abundant in colors.

Comparison of Water-Fastness Between Control and Experimental Dye Sets

In the water-fastness test, the plain paper is selected as the recoding medium due to its poor water-repellant property, in order to reveal the real ability of water-fastness of the ink.

The ink dye set of the invention and the comparative HP-C6578 are respectively ejected on the plain papers to form the printed images. The optical properties of the printed images are measured to obtain the chromaticity curves, and the results are presented in FIG. 6. The real line represents the chromaticity curve of the invention, and the dash line represents the chromaticity curve of HP-C6578. Subsequently, the plain papers with printed images are immersed in the deionized water for 30 minutes. After immersion, the plain papers are placed in the bench for drying at room temperature, and then the optical properties of printed images remained on the plain papers are measured to obtain the chromaticity curves. The results are presented in FIG. 7. Similarly, the real line represents the chromaticity curve of the invention, and the dash line represents the chromaticity curve of HP-C6578.

Figure 6:
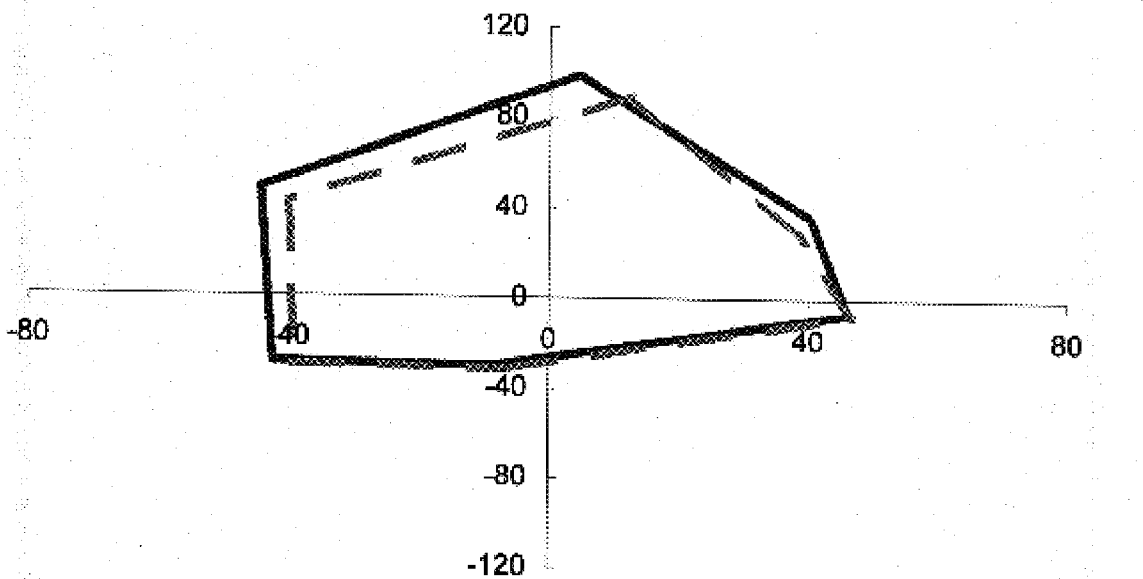
FIG. 6 is a chromaticity diagram of comparative HP-C6578 and ink dye set of the invention before immersion.
Figure 7:
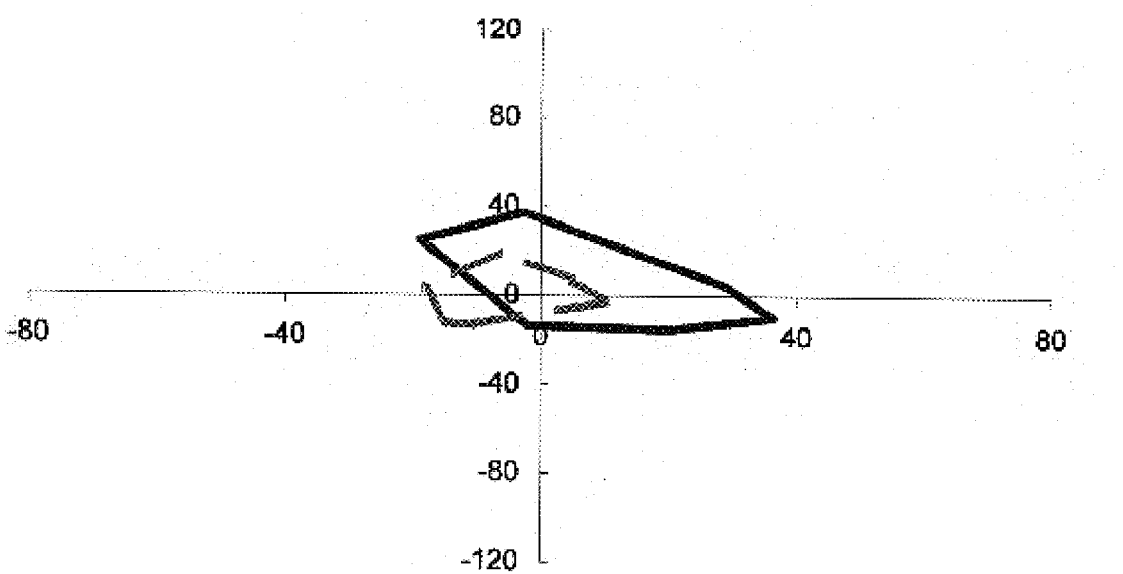
FIG. 7 is a chromaticity diagram of comparative HP-C6578 and ink dye set of the invention after immersion.

FIG. 6 indicated that the color gamut of the invention is larger than that of HP-C6578 before immersing in the deionized water. Although the clolor gamut of the invention and HP-C6578 are apparently shrunk after immersion, the former is much larger than the latter, as shown in FIG. 7. Therefore, the ink dye set of the invention exhibits a better property of water-fastness.

From the results in the aforementioned experiments, it is therefore apparent that the ink dye set of the invention has the advantages of great light-fastness, great water-fastness, broad color gamut, and high quality of printed image.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ink having a high light-fastness and a high water-fastness, comprising:
   (a) a cyan dye set which comprises direct blue 199 dye, acid blue 9 dye, and direct blue 86 dye;
   (b) a magenta dye set which comprises reactive red 180 dye, acid red 52 dye, and reactive red dye; and
   (c) a yellow dye set which comprises acid yellow 23 and direct yellow 86 dye; and
   (d) EHMPD (2-ethyl-2-methylol-1,3-propylene glycol) as a surfactant.

2. An ink-jet ink of a water-based multicolor dye set with a high light-fastness and a high water-fastness, comprising:
   a multicolor dye set, comprising:
      a cyan dye set which comprises direct blue 199 dye, acid blue 9 dye, and direct blue 86 dye;
      a magenta dye set which comprises reactive red 180 dye, acid red 52 dye, and reactive red dye; and
      a yellow dye set which comprises acid yellow 23 and direct yellow 86 dye;
   a solvent, wherein the solvent is an aqueous solution; and
   EHMPD (2-ethyl-2-methylol-1,3-propylene glycol) as a surfactant.

3. The ink-jet ink according to claim 2, wherein an amount of the surfactant is about 0.01 wt % to 10.0 wt %.

4. The ink-jet ink according to claim 3, wherein the amount of the surfactant is preferably about 4.0 wt %.

5. The ink-jet ink according to claim 2, further comprising a humectant.

6. The ink-jet ink according to claim 5, wherein the humectant is PEG 700 (polyethylene glycol 700).

7. The ink-jet ink according to claim 6, wherein an amount of the humectant is about 4.0 wt %.

8. The ink-jet ink according to claim 2, further comprising a chelating agent.

9. The ink-jet ink according to claim 8, wherein the chelating agent is urea.

10. The ink-jet ink according to claim 8, wherein an amount of the chelating agent is about 0.5 wt %.

11. The ink-jet ink according to claim 2, further comprising a pH buffer.

12. The ink-jet ink according to claim 11, wherein the pH buffer is potassium hydroxide.

13. The ink-jet ink according to claim 11, wherein an amount of the pH buffer is about 0.5 wt %.

14. The ink-jet ink according to claim 2, further comprising an organic solvent.

15. The ink-jet ink according to claim 14, wherein the organic solvent is 1,4-butandiol.

16. The ink-jet ink according to claim 14, wherein an amount of the organic solvent is about 0.5 wt % to 3.0 wt %.

17. The ink-jet ink according to claim 2, wherein the solvent is water, and an amount of said water is about 50 wt % to 85 wt %.

18. The ink-jet ink according to claim 2, further comprising a biocide.

19. The ink-jet ink according to claim 2, further comprising a preservative.

* * * * *